April 18, 1950   C. H. VAN HARTESVELDT   2,504,361
ANTIDETONANT FUEL
Filed Oct. 11, 1947
Fig. 1
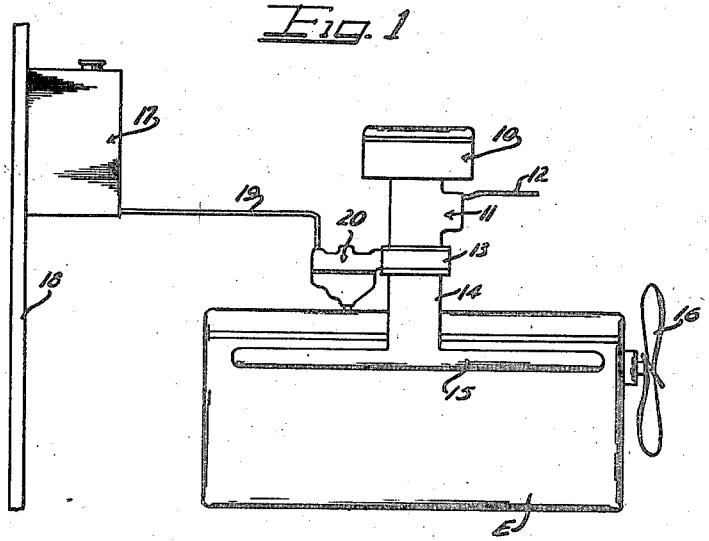
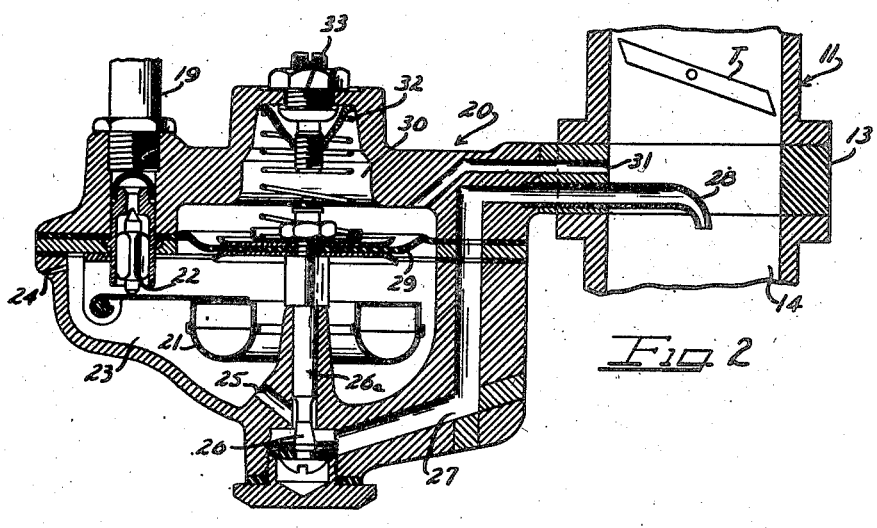
Fig. 2
Inventor
CARROLL H. VAN HARTESVELDT
by The Firm of Charles H. Kidd
Attys.

Patented Apr. 18, 1950

2,504,361

UNITED STATES PATENT OFFICE 2,504,361

ANTIDETONANT FUEL

Carroll H. Van Hartesveldt, Rosemont, Pa., assignor to Thompson Products, Inc., Cleveland, Ohio, a corporation of Ohio Application October 11, 1947, Serial No. 779,233

3 Claims. (Cl. 44—53)

This invention relates to supplemental fuels for internal combustion engines which will materially increase the octane rating or anti-knock capacity of standard engine fuel such as gasoline, while hindering formation of deleterious deposits in the engine.

Specifically the invention deals with supplementary fuels composed of monohydric alcohols, water, and anti-detonants such as tetraethyl lead, monomethyl aniline, and the like.

Heretofore the anti-detonant properties of main fuels, such as gasoline, for internal combustion engines were increased by the blending of anti-detonants such as tetraethyl lead into the fuel. The tetraethyl lead is thus continually fed to the engine during all conditions of engine operation, most of which do not require an anti-detonant. Aside from wastage of tetraethyl lead involved in the unwarranted continual feeding of the same into the engine under all operating conditions, deleterious lead oxide deposits are formed in the engine, causing early failure of engine parts such as spark plugs and valves.

According to the present invention, there is provided a supplementary fuel for injecting into an internal combustion engine only when engine operating conditions require anti-knock quality not available in the main hydrocarbon power fuel. The supplementary fuel of this invention is injected only when needed, and then only in the required amounts. The fuel of this invention contains a monohydric alcohol, water, and small amounts of additional anti-detonant such as tetraethyl lead, monomethyl aniline, iron or nickel carbonyls, glycols, benzene, phenols, xylidine and its homologues, and the like. These supplementary fuels are preferably introduced into the main fuel-air mixture being fed to the engine in properly metered amounts controlled by a metering unit or injector. This metering unit or injector is preferably automatically controlled by throttle valve setting of the engine. Since the throttle valve setting has a direct influence on engine intake manifold pressure, the metering unit or injector can be actuated by manifold pressure.

The supplementary fuels of this invention have enhanced anti-detonant effect even when used in very minute quantities. These supplementary fuels are so blended that they will not vaporize to the extent of restricting liquid flow in the supply tank and in the injection unit under temperatures encountered in the use of such a tank and unit, and still will be sufficiently volatile to vaporize and be uniformly distributed to each cylinder of a multi-cylinder engine.

Since ash-forming ingredients of the supplementary fuel are present in minor proportions, and are injected with alcohol and water, formation of deleterious deposits in the engine from these ingredients will be hindered because the alcohol and water prevent adherence of the ash material on the engine surfaces. Of course, since the anti-detonants are used only when needed, and then only in metered quantities to offset deleterious engine combustion conditions, the total quantity of ash-producing anti-detonant introduced into the engine will be quite negligible as compared with the quantities heretofore involved.

The fuels of this invention may contain halides or other materials which are corrosive to common metals used for supplemental fuel tanks and injector units or metering devices. The present invention contemplates the incorporation of materials such as soluble oils which will prevent this corrosion and also prevent precipitation of slimes or other deposits from the supplementary fuel.

Since the supplementary fuels of this invention are introduced separately into the main power fuel and air mixture being fed to the engine, only when they are needed, they should not cause excessive temporary enrichment of the fuel charge to the engine. The supplementary fuels are therefore blended so as to have minimum enrichment properties consistent with other requirements.

It is therefore an object of this invention to provide a supplementary fuel for internal combustion engines composed of one or more monohydric alcohols, water, and smaller amounts of anti-detonants such as metallo-organic compounds, aromatic hydrocarbons, anilines, phenols, glycols, and the like.

Another object of the invention is to provide a supplementary fuel for periodic injection in an internal combustion engine and composed of a monohydric alcohol, water, and an anti-detonant in amounts proportioned to materially increase the anti-knock quality of a hydrocarbon fuel-air charge without encountering immediate and long-term disadvantages.

A still further object of the invention is to provide a supplementary fuel which will burn without robbing excessive amounts of air from a main power fuel into which it is periodically injected only when engine operating conditions require the anti-knock properties thereof.

A still further object of the invention is to provide a supplementary fuel containing anti-detonants normally tending to form deleterious deposits in an internal combustion engine, but so blended with coolants and other anti-detonants as to prevent such deposits.

A specific object of the invention is to provide a fuel composed of water, tetraethyl lead, and sufficient monohydric alcohol to hold the tetraethyl lead in solution.

Other and further objects of the invention will be apparent to those skilled in the art from the following detailed description of the annexed sheet of drawings, which shows suitable apparatus for injecting the supplemental fuel of this invention into an internal combustion engine in accordance with the teachings of this invention. The following examples also show preferred embodiments of the invention.

On the drawings:

Figure 1 is a diagrammatic side elevational view of an internal combustion engine and fuel intake assembly equipped with a supplementary fuel injector or metering device for supplying supplementary fuel of this invention to the intake manifold of the engine.

Figure 2 is a vertical cross-sectional view, with parts in elevation, of the fuel injector or metering device used for supplying the supplementary fuel of this invention to the engine when needed and then only in the required amounts.

As shown on the drawings:

In Figure 1 a high compression internal combustion engine E is equipped with the customary air and fuel-charging assembly including an air cleaner 10, a carburetor 11 receiving air from the cleaner 10, and a main fuel from a feed line 12. A mounting block 13 is interposed between the carburetor 11 and the inlet 14 of the intake manifold 15 for the engine E. Atomized fuel and air from the carburetor 11 passes through the block 13 to the inlet 14 and is distributed by the manifold 15 to the cylinders of the engine. A fan 16 is provided on the engine E as is conventional in automotive engines.

A relatively small tank 17 for supplementary anti-detonant fuel is mounted on the fire wall 18 of the vehicle driven by the engine E. Supplementary anti-detonant fuel, such as a mixture of alcohol and water, preferably composed of monohydric alcohol, water, tetraethyl lead, and the required halides present in commercial traethyl lead, is fed from the tank 17 through a feed line 19 to a metering device 20 mounted on the block 13. This metering device is best shown in Figure 2 and includes a float 21 controlling an inlet valve 22 receiving the supplementary fuel from the tube or pipe 19. The float 21 is mounted in a float chamber 23 which receives the fuel from the inlet valve 22. The float chamber 23 is vented to the atmosphere at 24 and fuel under atmospheric pressure in the float chamber flows through a passage 25 to a diaphragm-controlled metering valve 26 and thence through a passageway 27 to a nozzle 28 carried by the block 13 and opening downstream in the inlet 14.

The metering valve 26 has a stem portion 26a slidably mounted in a boss provided by the float chamber-defining casing. The upper end of the stem is connected to a diaphragm 29 which separates the float chamber 23 from a spring chamber 30. The spring chamber 30 is vented by a passageway 31 to the interior of the block 13 so that the spring chamber is under the influence of the vacuum existing in the inlet 14 for the engine E. A spring 32 is mounted in the spring chamber 30 and is adjusted by means of adjusting mechanism 33 to exert a downward pressure on the diaphragm 29 tending to open the metering valve 26. As vacuum builds up in the engine inlet 14, the chamber 30 is evacuated and its diaphragm 29 is raised against spring pressure to move the metering valve toward closed position.

Since the supplementary fuel or anti-detonant need only be fed to the engine during those periods of operation when detonation may occur, and since such periods of engine operation are accompanied by decreased vacuum or increased pressure in the inlet 14, the spring 32 is effective to move the metering valve 26 toward open position, because the vacuum in the chamber 30 is insufficient to overcome the spring pressure. Supplementary fuel is thereupon injected in amounts determined by the opening of the metering valve. The fuel is discharged through the nozzle 28 and commingles with the atomized gasoline and air mix in the inlet 14. The nozzle 28 has its discharge orifice facing downstream and the supplementary fuel is intimately admixed in fine spray form with the main fuel and air mixture. As the intake manifold pressure decreases to increase the vacuum in the chamber 30, likelihood of detonation in the engine decreases and the diaphragm 29 will pull the metering valve to closed or substantially closed position.

The main fuel and air feed is controlled by a throttle T as shown in Figure 2 and intake vacuum is the function of the degree of opening of this throttle. Thus, when the throttle is substantially closed, the intake vacuum is high, and when the throttle is substantially open, the intake vacuum is low. Therefore, supplemental fuel is introduced under full throttle conditions, and, instead of using an intake manifold pressure-actuated diaphragm, such as 29, the operation of the metering valve 26 can be actuated by a linkage arrangement with the throttle valve. The main fuel fed to the carburetor 11 can be a conventional gasoline having a low or medium octane number. This main gasoline will be free from expensive anti-detonants such as tetraethyl lead, or, if desired, can contain smaller amounts of such anti-detonants than were heretofore deemed necessary. The anti-detonant deficiency of the main fuel is entirely offset by the supplemental fuel of this invention.

Tetraethyl lead $(Pb(C_2H_5)_4)$ is prepared commercially with added amounts of ethylene dibromide and ethylene dichloride in quantities sufficient to form, in the engine, sufficient amounts of volatile lead halides which will assist removal of lead deposits. The term "tetraethyl lead" as used herein, therefore, denotes the commercial product containing these added halides.

In order to maintain the commercial tetraethyl lead in solution in the supplementary fuels of this invention, it is necessary that the fuels contain sufficient monohydric alcohol. At present, the Federal health laws of the United States limit the maximum concentration of tetraethyl lead in gasoline for certain uses to 3 cc. per gallon of gasoline, because the tetraethyl lead is quite toxic. The following table shows the minimum alcohol content required for fuels containing various monohydric alcohols and 3 cc. of tetraethyl lead per gallon:

| Supplemental Fuel | Minimum Alcohol Content for Solubility of 3 cc. of Tetraethyl Lead per Gallon. |
|---|---|
| | Per cent |
| Methanol—Water | 73.5 |
| Ethanol—Water | 55.1 |
| Isopropanol—Water | 38.5 |

With higher concentrations of the alcohols the tetraethyl lead increases rapidly. For example, a supplemental fuel composed of 75% methanol and 25% water will dissolve 10.35 cc. of tetraethyl lead per gallon.

Since the higher molecular weight alcohols, such as isopropanol, will hold the tetraethyl lead in solution with a higher proportion of water than the lower molecular weight alcohols, these higher molecular weight alcohols can be used as blending agents with methanol or ethanol to increase the permissible amounts of water in a solution which will dissolve 3 cc. of tetraethyl lead per gallon. For example, a solution containing methanol, isopropanol, and water will dissolve 3 cc. of tetraethyl lead per gallon with less total alcohol than if methanol were used alone. The organic anti-detonant compounds disclosed herein can also be used to enhance the solubility of tetraethyl lead in water solutions.

The anti-knock effect of adding tetraethyl lead to the alcohols listed in the above table and to various water solutions of these alcohols was determined by comparisons made in a Chevrolet truck engine connected to an electric dynamometer, and also in road tests of other engines in cars and trucks. In the dynamometer-loaded Chevrolet truck engine running at full throttle, the solutions were injected in the amount required to give an anti-knock quality effect equal to 20 octane numbers. The octane number is the rating of a fuel as to its anti-knock properties in a standard engine compared to standard reference fuels consisting of iso-octane and normal heptane mixed in various proportions. Results of the tests on the dynamometer-loaded Chevrolet truck engine are tabulated hereinbelow:

| Solution | Amount of Solution Injected as Per Cent of Gasoline | |
|---|---|---|
| | No Tetraethyl Lead | 3 cc. Tetraethyl Lead Per Gallon |
| 100% Methanol | 21.1 | 14.9 |
| 85% Methanol, 15% Water | 22.6 | 18.1 |
| 75% Methanol, 25% Water | 24.0 | 21.0 |
| 100% Ethanol | 21.6 | 17.1 |
| 80% Ethanol, 20% Water | 24.1 | 18.7 |
| 60% Ethanol, 40% Water | 28.0 | 21.7 |
| 100% Isopropanol | 24.0 | 18.7 |
| 75% Isopropanol, 25% Water | 28.0 | 21.1 |
| 50% Isopropanol, 50% Water | 36.0 | 25.6 |

In another test on the dynamometer-loaded Chevrolet engine, it was established that increased tetraethyl lead contents in the supplementary fuel decreased the amount of fuel required to produce the desired octane number improvement. Thus, a 22 octane number improvement required the following supplementary fuel injections of the fuels indicated in the table.

| Tetraethyl lead content of 85% Methanol, 15% Water Solution | Amount of Solution Injected as Per Cent of Gasoline |
|---|---|
| No tetraethyl lead | 30 |
| Tetraethyl lead, 3 cc. per gallon | 20 |
| Tetraethyl lead, 6 cc. per gallon | 16 |

Additional testing was done in the dynamometer-loaded Chevrolet truck engine, and on the road in a Chevrolet passenger car, and a Ford truck, to determine the effect of adding the tetraethyl lead to the anti-detonant solution in terms of octane numbers. The following table shows the octane number improvement obtained from the tetraethyl lead when the supplemental fuel is injected in various proportions based on the main hydrocarbon fuel:

| Engine (Test Method) | Fluid | Per Cent Injected Based On Gasoline | Octane No. Improvement | Octane No. Improvement From T. E. L. |
|---|---|---|---|---|
| Chevrolet Truck (Dynamometer) | 73.5% Methanol / 26.5% H₂O | 6.4 | 4.0 | |
| Chevrolet Truck (Dynamometer) | 73.5% Methanol / 26.5% H₂O / 3 cc. T. E. L./Gal | 6.4 | 6.0 | 2.0 |
| Chevrolet Truck (Dynamometer) | 73.5% Methanol / 26.5% H₂O | 13.6 | 11.0 | |
| Chevrolet Truck (Dynamometer) | 73.5% Methanol / 26.5% H₂O / 3 cc. T. E. L./Gal | 13.6 | 13.0 | 2.0 |
| Chevrolet Passenger Car (Chassis Dyno.) | 73.5% Methanol / 26.5% H₂O | 10.9 | 9.3 | |
| Chevrolet Passenger Car (Chassis Dyno.) | 73.5% Methanol / 26.5% H₂O / 3 cc. T. E. L./Gal | 10.9 | 11.8 | 2.5 |
| Ford Truck (Road) | 73.5% Methanol / 26.5% H₂O | 9.5 | 9.0 | |
| Ford Truck (Road) | 73.5% Methanol / 26.5% H₂O / 3 cc. T. E. L./Gal | 9.5 | 12.0 | 3.0 |

The presence of water in the anti-detonant solutions allows the attainment of a given anti-knock effect with lower alcohol consumption especially when ethanol and/or isopropanol are used. In the case of methanol solutions containing tetraethyl lead, the effect of water in some engines does not give a net saving in alcohol, but it does serve the useful purpose of purging combustion chamber deposits, and raising the boiling point to decrease vapor lock tendencies of the fuel.

Data on the effect of water in solutions containing 3 cc. tetraethyl lead per gallon is shown below in the following table wherein the amount of alcohol required to give the equivalent of 20 octane numbers in the dynamometer-loaded Chevrolet truck engine is listed:

| Alcohol | Solution | Amount of Alcohol required as per cent of gasoline |
|---|---|---|
| Methanol | No Water | 14.9 |
| Do | 15% Water | 15.4 |
| Do | 25% Water | 15.8 |
| Ethanol | No Water | 17.0 |
| Do | 20% Water | 15.0 |
| Do | 40% Water | 13.0 |
| Isopropanol | No Water | 18.7 |
| Do | 25% Water | 15.8 |
| Do | 50% Water | 12.8 |
| Do | 61.5% Water | 11.2 |

From the standpoint of good distribution and complete evaporation and mixing in the intake manifold of the engine, the supplementary fuel should be as volatile as possible without, however, being sufficiently volatile to vaporize in the supplemental fuel tank 17 or the injector metering device 20. Since temperatures encountered in engine operation may heat these tanks and devices as high as 150 to 180° F., the supplemental should be so blended that it will not sufficiently volatilize at these temperatures to cause vapor lock. The best compromise between ready evaporation in the intake manifold and freedom from vapor lock can be obtained by mixing low boiling and higher boiling alcohols with water. Thus, while a supplemental fuel containing methanol with low concentrations of water would vapor lock, methanol could be blended with higher concentrations of water and/or with higher boiling point alcohols to produce a solution that would not vapor lock. Further, seasonal temperature changes will affect the maximum temperatures to which the supplemental fuel is subjected before it is injected into the engine and the blends can vary with the seasonal changes.

By injecting the supplementary fuel containing tetraethyl lead only when the engine requires it, the use of tetraethyl lead is minimized, and the possibilities of lead deposit formation in the engine are also minimized. In addition, when tetraethyl lead is injected along with water and alcohol, adherence of lead oxide to spark plugs and combustion chamber surfaces is prevented. This is in sharp contrast to results when tetraethyl lead is used in the primary fuel. For example, when running a Chevrolet engine continuously at full throttle, with tetraethyl lead in the gasoline, the spark plugs needed adjustment or replacement every 10 to 20 hours. Valves were burned under these conditions in 35 hours. With 3 cc. of tetraethyl lead per gallon of alcohol-water solution injected constantly, and with no lead in the primary gasoline fuel, the spark plugs were examined after 70 hours of operation without failure and were found to be in excellent condition. The valves were likewise in excellent condition.

Since decomposition products formed by hydrolysis, oxidation, and the like reactions on the ingredients of the supplemental fuel of this invention may render the fuel somewhat corrosive to common metals used for tanks and metering devices, it is desirable to incorporate small amounts of corrosion preventatives and dispersants in the fuel to protect the metals and prevent precipitation of reaction products. Suitable additives with both corrosion preventative and dispersant properties are emulsifiable petroleum oils containing organic sulphonates and soaps. For example, a composition containing neutral petroleum oil and from 16 to 20% petroleum sulphonates and other soaps is satisfactory. These petroleum sulfonic acids are complex mixtures of sulfonic acids of aromatic hydrocarbon, cycloparaffins, and high molecular weight paraffins obtained from petroleum refinery sludge. Since these compositions are emulsifiable, the sulfonic acids are of the green acid type. Dispersants such as fatty alcohol sulphonates can be used in combination with corrosion inhibitors such as borax, sodium dichromate, and the like.

It is preferred that the supplemental fuels of this invention contain a minimum amount of combustible material per octane number improvement gained thereby so that there will be little fuel enrichment when the supplemental fuel is injected. The use of supplemental fuel of this invention therefore does not require deriching attachments and the like for the main fuel carburetor. The water contents of the supplemental fuels, of course, have no fuel value. The combustible fuel value of methanol is less than ethanol, while isopropanol and isobutanol have increasing fuel values.

The following table shows examples of anti-detonant solutions according to this invention which have been tested for their anti-knock effect in the dynamometer-loaded Chevrolet truck engine. In order to maintain an improvement equivalent to 19 octane numbers, the table shows the minimum flow of the specified anti-detonant solution necessary to prevent detonation:

| | Composition of Anti-Detonant Solution | Per Cent of Solution Injected Based on Gasoline |
|---|---|---|
| 1 | 73.5% Methanol<br>23.5% Water<br>3 cc. Tetraethyl lead per gallon | 17.9 |
| 2 | 70% Methanol<br>10% Benzene<br>20% Water | 22.8 |
| 3 | 60% Methanol<br>10% Monomethyl Aniline ($C_6H_5NH\ CH_3$)<br>30% Water | 13.2 |
| 4 | 50% Methanol<br>10% Xylidine<br>40% Water | 15.1 |
| 5 | 66% Methanol<br>10% Cresol<br>24% Water<br>2.7 cc. Tetraethyl lead per gallon | 17.3 |

In general, the supplemental fuels of this invention are composed of one or more monohydric alcohols with minor amounts of additional anti-detonants such as metallo-organic compounds, aromatic hydrocarbons, anilines, phenols, glycols, and the like, and very small amounts of a corrosion-preventing dispersant to nullify the corrosion effect of the fuels on common metals and to prevent formation of slime deposits.

The monohydric alcohols can contain from 1 to 5 carbon atoms. The selected additional anti-detonants must be soluble in these alcohols in proportions sufficient to produce the desired anti-knock effect. Anti-detonants such as phenols, glycols, anilines, and aromatic hydrocarbons are not as potent as tetraethyl lead and must be used in larger amounts ranging from about 5 to 20% by volume of the supplementary fuel. Tetraethyl lead is the preferred anti-detonant and is used in quantities varying between 0.1 to 15 cc. per gallon of supplementary fuel either with or without the other less potent anti-detonants.

The supplementary fuels of this invention also preferably contain water in lesser amounts than will precipitate the anti-detonant out of solution. The water content will therefore vary with the selected alcohol as well as with the selected anti-detonant. Water can be present in amounts up to 65% in some blends of the supplementary fuel and is used with the above-specified range of non-metallic anti-detonants in amounts ranging from 5 to 65% by volume. The alcohol content in such a blend will vary from 30 to 90% by volume.

The preferred supplementary fuels of this invention contain, by volume, 50 to 90% of lower molecular weight monohydric alcohols, and 50 to 10% water, to which is added 0.1 to 15 cc. tetraethyl lead per gallon and 0.1 to 1% corrosion-preventing dispersant. Specific examples of such preferred supplementary fuels for summer and winter use are as follows:

|  | Summer Use | Winter Use |
|---|---|---|
| Methanol...parts by volume | 42.5 | 85 |
| Isopropanol...do | 42.5 | |
| Water...do | 15 | 15 |
| Tetraethyl lead...cc. per gallon | 3 | 3 |
| Petroleum oil containing petroleum sulphonates and soaps...parts by volume | ¼ to 1 | ¼ to 1 |

It should be understood that the supplementary fuels of this invention are designed primarily to provide the main power fuel-air charge with the desired anti-knock properties. These supplementary fuels require much less oxygen for combustion than the main hydrocarbon power fuels with which they are used. They are injected into the main hydrocarbon fuel-air charge being delivered from the internal combustion engine carburetor, without robbing sufficient air from the mixture to cause power loss due to enrichment of the charge. They are fed to the main fuel-air charge only when the engine is operating under detonating conditions, and then only in amounts sufficient to stop the detonation.

The term "consisting essentially of" as used in the claims does not exclude minor additions of ingredients which will not effect the basic characteristics of the composition such as corrosion preventatives and dispersants, and the like.

I claim as my invention:

1. A supplementary anti-detonant fuel adapted for periodic introduction into a main hydrocarbon power fuel-air mixture and consisting essentially of 3 to 6 cc. of tetraethyl lead per gallon of supplementary fuel, and an aqueous solution consisting of not less than about 73.5% by volume methanol and the balance water.

2. A supplementary anti-detonant fuel adapted for periodic introduction into a main hydrocarbon power fuel-air mixture and consisting essentially of .1 to 15 cc. of tetraethyl lead per gallon of the supplementary fuel, and an aqueous alcohol solution consisting of 50 to 90% by volume of monohydric alcohol containing 1 to 5 carbon atoms and 50 to 10% by volume of water, said tetraethyl lead being dissolved in the alcohol and the water content being insufficient to precipitate the tetraethyl lead.

3. A supplementary anti-detonant fuel adapted for periodic introduction into a main hydrocarbon power fuel-air mixture and consisting essentially of 3 to 6 cc. tetraethyl lead per gallon of supplementary fuel and an aqueous alcohol solution consisting of 85% by volume of methanol and 15% by volume of water.

CARROLL H. VAN HARTESVELDT.

REFERENCES CITED

The following references are of record in the file of this patent:

UNITED STATES PATENTS

| Number | Name | Date |
|---|---|---|
| 2,316,739 | Cook | Apr. 13, 1943 |
| 2,404,094 | Robertson | July 16, 1946 |
| 2,429,707 | Catalano | Oct. 28, 1947 |